(12) United States Patent
Fan et al.

(10) Patent No.: US 10,880,421 B2
(45) Date of Patent: Dec. 29, 2020

(54) ELECTRONIC DEVICE

(71) Applicant: BEIJING XIAOMI MOBILE SOFTWARE CO., LTD., Beijing (CN)

(72) Inventors: Liantao Fan, Beijing (CN); Hongzhi Jin, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/699,238

(22) Filed: Nov. 29, 2019

(65) Prior Publication Data
US 2020/0344339 A1    Oct. 29, 2020

(30) Foreign Application Priority Data
Apr. 28, 2019   (CN) .......................... 2019 1 0351856

(51) Int. Cl.
*H05K 5/00* (2006.01)
*H04M 1/02* (2006.01)
*H04N 5/225* (2006.01)

(52) U.S. Cl.
CPC ........ *H04M 1/0264* (2013.01); *H04N 5/2252* (2013.01); *H04N 5/225251* (2018.08)

(58) Field of Classification Search
CPC ....................................................... H05K 5/00
See application file for complete search history.

(56) References Cited

U.S. PATENT DOCUMENTS

| 5,362,144 A * | 11/1994 | Shioya ................. B60K 37/02 312/319.6 |
| 5,557,329 A | 9/1996 | Lim |
| 2008/0165504 A1* | 7/2008 | McCoy ................. F16M 11/08 361/724 |
| 2016/0205293 A1 | 7/2016 | Jung et al. |

FOREIGN PATENT DOCUMENTS

| CN | 103533222 B | 1/2014 |
| CN | 107197133 A | 9/2017 |
| CN | 108600596 A | 9/2018 |
| CN | 109246342 A | 1/2019 |
| TW | M568985 U | 10/2018 |

OTHER PUBLICATIONS

OA for EP Application 19219575.8-1208(EESR), mailed on May 6, 2020.

* cited by examiner

*Primary Examiner* — Jerry Wu
(74) *Attorney, Agent, or Firm* — Syncoda LLC; Feng Ma

(57) ABSTRACT

An electronic device includes a device body, a rear camera module, and a lifting and rotating assembly. A side enclosure of the device body is provided with a camera extending-retracting hole. The rear camera module is disposed in the device body and can be ejected from or retracted into the device body through the camera extending-retracting hole. The lifting and rotating assembly is connected with the rear camera module, and drives the rear camera module to be ejected from the device body through the camera extending-retracting hole and rotate to a front image capturing position.

14 Claims, 3 Drawing Sheets

ELECTRONIC DEVICE

CROSS-REFERENCE TO RELATED APPLICATION

The application claims priority to Chinese Patent Application Serial No. 201910351856.6 filed on Apr. 28, 2019, the disclosure of which is hereby incorporated by reference in its entirety.

BACKGROUND

At present, one of the main development trends in electronic devices is towards a high screen-to-body ratio. However, an electronic device usually has a front camera module, and a display screen of the electronic device needs to be provided with a light transmission hole cooperating with the camera module.

SUMMARY

The present disclosure relates generally to a technical field of electronic devices, and more specifically to an electronic device with a camera.

Embodiments of the present disclosure provide an electronic device. The electronic device includes: a device body having a side enclosure provided with a camera extending-retracting hole; a rear camera module provided in the device body and being able to be ejected from or retracted into the device body through the camera extending-retracting hole; and a lifting and rotating assembly connected with the rear camera module, and driving the rear camera module to be ejected from the device body through the camera extending-retracting hole and rotate to a front image capturing position.

BRIEF DESCRIPTION OF THE DRAWINGS

The drawings herein are incorporated into the specification and constitute a part of the disclosure, and embodiments consistent with the present disclosure are shown and used with the specification to explain principles of the present disclosure.

DETAILED DESCRIPTION

Figure 1:
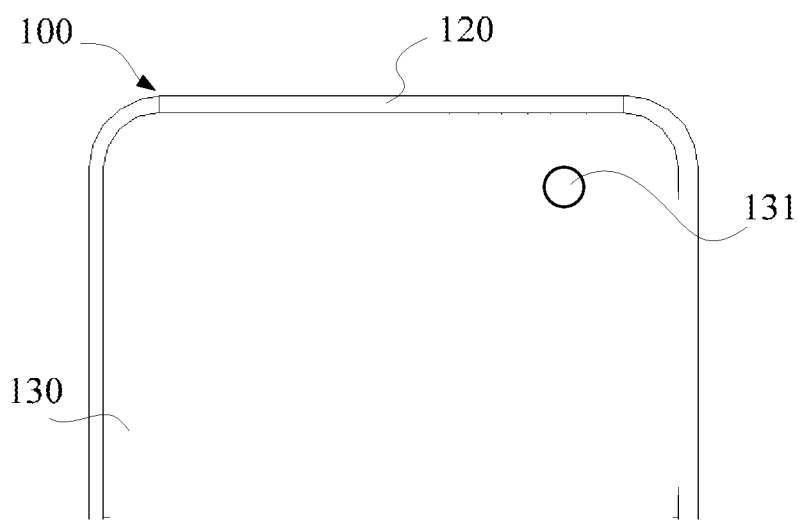
FIG. 1 illustrates a schematic view of a state when an electronic device does not perform front image capturing according to some embodiments of the present disclosure.

Exemplary embodiments of the present disclosure will be described in detail and examples of the embodiments will be illustrated in the drawings. In the following description involving the drawings, unless indicated otherwise, the same numerals in different drawings represent the same or similar elements. Implementations described in the exemplary embodiments do not represent all implementations consistent with the present disclosure, and instead, they are merely examples of devices and methods consistent with some aspects of the present disclosure, as detailed in the appended claims.

A lifting front camera module can be adopted to realize full screen display effect. When capturing an image, the front camera module is ejected from a device body. However, an electronic device generally needs to satisfy a rear image capturing function as well, so the electronic device is also provided with a rear camera module. The co-existence of the rear camera module and the lifting front camera module not only causes high device cost, but also occupies more space in the device body.

Various embodiments of the present disclosure can achieve a full screen while considering the camera module.

FIGS. 1 through 6 are schematic views of electronic devices according to various embodiments. The drawings are only exemplified by a mobile phone, and the electronic device according to the embodiments of the present disclosure may be a mobile phone, a tablet computer, a wearable device, a medical device or the like.

As illustrated in FIGS. 1-6, the electronic device includes a device body 100, a rear camera module 200, and a lifting and rotating assembly 300.

Figure 2:
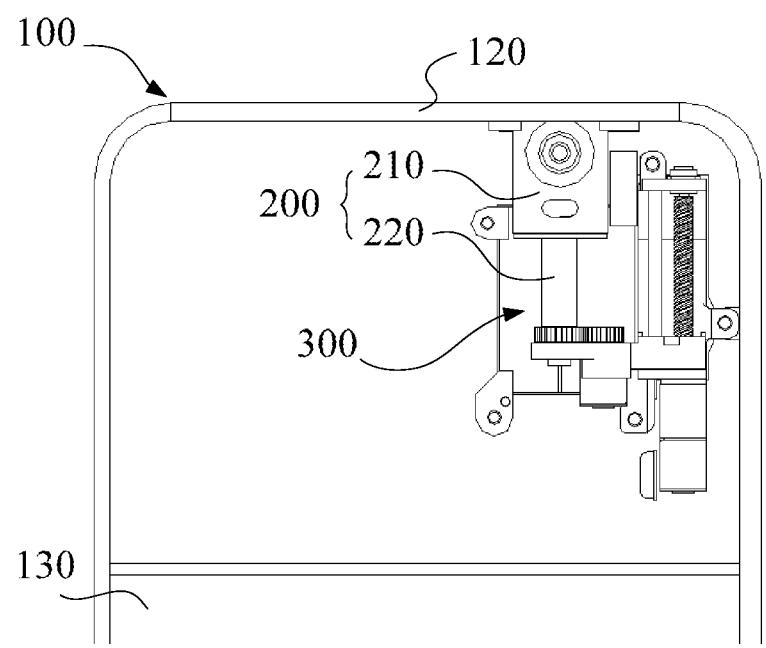
FIG. 2 illustrates a sectional view of the electronic device in FIG. 1 when it does not perform front image capturing.

FIG. 1 illustrates a schematic view of a state when an electronic device does not perform front image capturing according to some embodiments of the present disclosure, and FIG. 2 illustrates a sectional view of the electronic device in FIG. 1 when it does not perform front image capturing.

In some embodiments, the device body 100 includes a display surface 110, a side enclosure 120 connected to the display surface 110, and a back cover 130 connected to a side of the side enclosure 120 away from the display surface 110. The display surface 110, the side enclosure 120, and the back cover 130 enclose an inner cavity. The rear camera module 200 and the lifting and rotating assembly 300 are disposed in the inner cavity.

The back cover 130 is provided with a light transmission hole 131 configured to cooperate with the rear camera module 200. Moreover, the side enclosure 120 is provided with a camera extending-retracting hole 121, and the camera extending-retracting hole 121 communicates an exterior of the device body 100 with an interior thereof to allow the rear camera module 200 to be ejected.

In some embodiments, the camera extending-retracting hole 121 is provided in an upper portion of the side enclosure 121, and the rear camera module 200 is ejected from the device body 100 from bottom to top.

In some embodiments, the camera extending-retracting hole 121 is provided in a left or right portion of the side enclosure 120, and the rear camera module 200 is ejected from a lateral portion of the device body 100.

The rear camera module 200 in the device body 100 is disposed correspondingly to the light transmission hole 131 of the back cover 130. Accordingly, the rear camera module 200 receives light incident from the light transmission hole 131, and performs rear image capturing. Moreover, the rear camera module 200 can also be ejected from the device body 100 through the camera extending-retracting hole 121.

In some embodiments, the rear camera module 200 includes a main body 210, and a camera is encapsulated in the main body 210. In some embodiments, the camera 210 is selected from a telephoto camera, a wide-angle camera, a fisheye lens, a macro lens, or any combination thereof. Moreover, when the rear camera module 200 includes a plurality of cameras 210, the arrangement of the plurality of cameras 210 is not limited. For example, the plurality of cameras 210 are arranged in a line or distributed in a triangular shape. In some embodiments, the main body 210 further includes an auxiliary component, such as a flashlight, to optimize the image capturing effect of the camera module 200.

The rear camera module 200 further includes a connecting portion 220 disposed to the main body 210. The connecting portion 220 is configured to be connected with the lifting and rotating assembly 300. In some embodiments, the connecting portion 220 is disposed to the main body 210, such that the rear camera module 200 is ejected from the device body 100 from bottom to top or retracted into the device body 100. Moreover, the connecting portion 220 and the main body 210 are fixedly connected to realize stable up-and-down movement or rotation of the rear camera module 200 under the drive of the lifting and rotating assembly 300.

The lifting and rotating assembly 300 is connected with the rear camera module 200.

Figure 3:
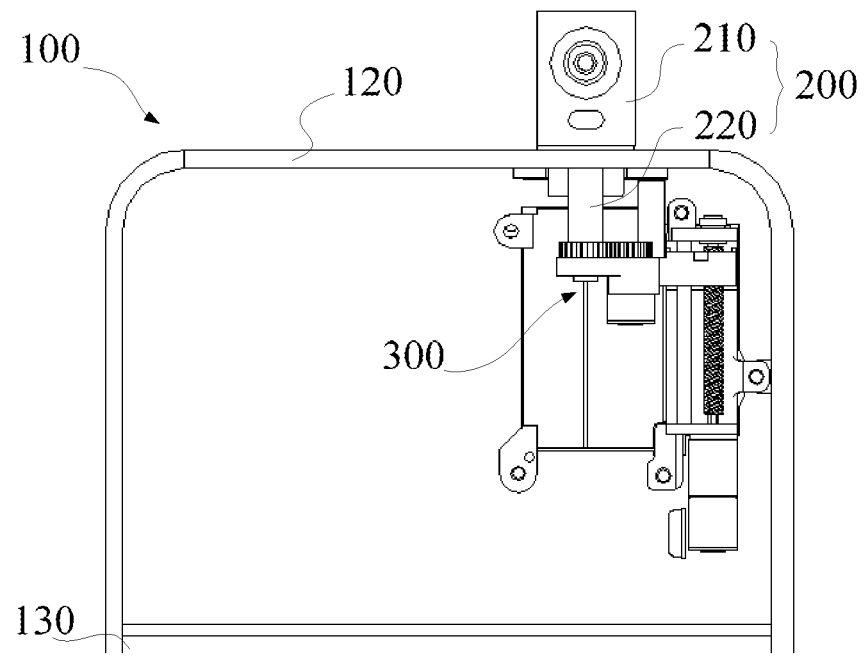
FIG. 3 illustrates a schematic view of a state when a rear camera module in an electronic device protrudes out of a device body according to some embodiments of the present disclosure.

FIG. 3 illustrates a schematic view of a state when a rear camera module in an electronic device protrudes out of a device body according to some embodiments of the present disclosure.

As illustrated in FIG. 3, the lifting and rotating assembly 300 drives the rear camera module 200 to be ejected from or retracted into the device body 100 via the camera extending-retracting hole 121.

Figure 4:
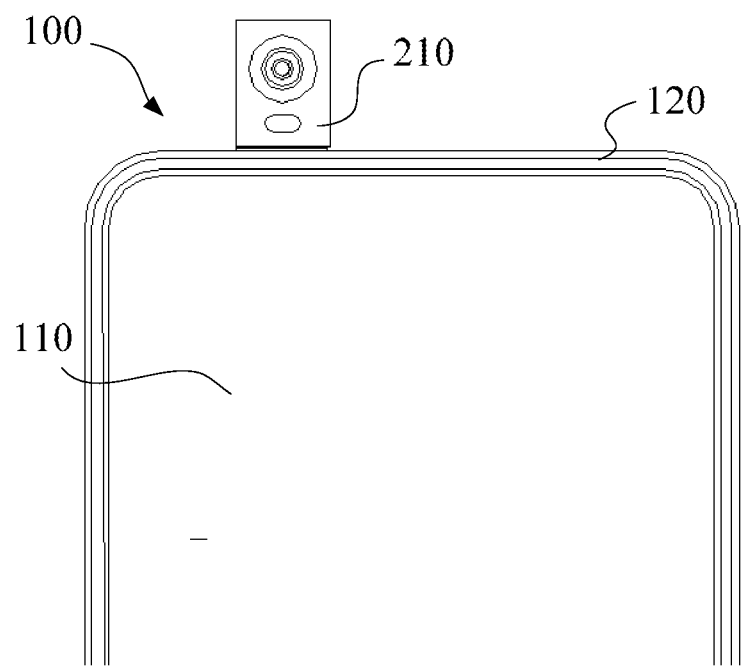
FIG. 4 illustrates a schematic view of a state when an electronic device performs front image capturing according to some embodiments of the present disclosure.

FIG. 4 illustrates a schematic view of a state when an electronic device performs front image capturing according to some embodiments of the present disclosure.

As illustrated in FIG. 4, the lifting and rotating assembly 300 drives the rear camera module 200 that has already been ejected from the device body 100 to rotate to a front image capturing position.

In some embodiments, the lifting and rotating assembly 300 drives the rear camera module 200 ejected from the device body 100 to rotate by at least 180°. When the rear camera module 200 is ejected from the device body 100, the rear camera module 200 is still in a rear image capturing state, and hence the lifting and rotating assembly 300 drives the rear camera module 200 to rotate by 180°, whereby the rear camera module 200 can rotate to a front image capturing state. At this time, the rear camera module 200 can be used for implementing front image capturing.

For the electronic device according to the embodiments of the present disclosure, the lifting and rotating assembly 300 pushes the rear camera module 200 to the outside of the device body 100, and drives the rear camera module 200 to rotate to the front image capturing position. In such a way, on one hand, it is unnecessary to provide a light transmission hole for front image capturing in the display surface 110 of the device body 100, thereby realizing full screen display effect; on the other hand, the rear camera module 200 is used for implementing front image capturing, the electronic device does not need to be provided with both of a rear camera module and a front camera module, thereby reducing the device cost and decreasing the space occupied by the camera module in the device body.

In addition, compared with the solution in the related art that the front camera module is adopted to implement front image capturing, front image capturing by means of the rear camera module 200 can improve front image capturing effect and optimize user experience.

In some embodiments, the lifting and rotating assembly 300 includes a rotation driving member 310 connected with the rear camera module 200, and the rear camera module 200 is driven to rotate by means of the rotation driving member 310. In some embodiments, the rotation driving member 310 is a stepper motor.

As an alternative, the rotation driving member 310 is directly connected with the rear camera module 200. For example, the rotation driving member 310 and the rear camera module 200 are connected and coaxially arranged. In such a way, the assembly of the rotation driving member 310 and the rear camera module 200 is facilitated.

Figure 5:
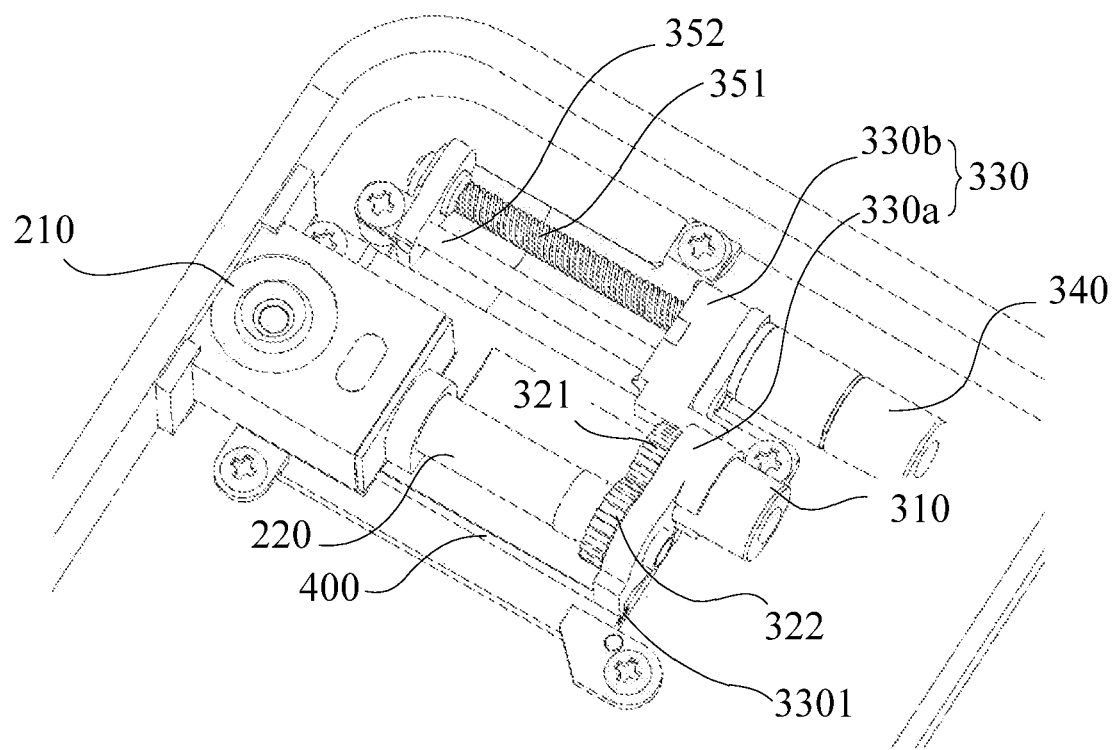
FIG. 5 illustrates a schematic view of a lifting and rotating assembly in an electronic device according to some embodiments of the present disclosure.

FIG. 5 illustrates a schematic view of a lifting and rotating assembly in an electronic device according to some embodiments of the present disclosure.

As another alternative, as illustrated in FIG. 5, the rotation driving member 310 is drivingly connected to the rear camera module 200. Moreover, a rotating shaft of the rotation driving member 310 is juxtaposed with a rotating shaft of the rear camera module 200.

In such a way, the rotation driving member 310 and the rear camera module 200 are staggered. In such a case, cables of the rotation driving member 310 and the rear camera module 200 can be arranged conveniently. For example, a portion of the rotation driving member 310 and a portion of the rear camera module 200 which are staggered from each other are each provided with a cable interface. Thus, the cables can keep tidy, and the internal structural stability of the electronic device can be optimized.

The drivingly connecting of the rotation driving member 310 to the rear camera module 200 can be in such a way that a first rotating member 321 is provided at an output end of the rotation driving member 310, and the rear camera module 200 is provided with a second rotating member 322. The first rotating member 321 meshes with the second rotating member 322. For example, the first rotating member 321 and the second rotating member 322 are meshing gears.

In some embodiments, the second rotating member 322 is provided to the connecting portion 220 of the rear camera module 200, and the second rotating member 322 is disposed to an end of the connecting portion 220 away from the main body 210.

Figure 6:
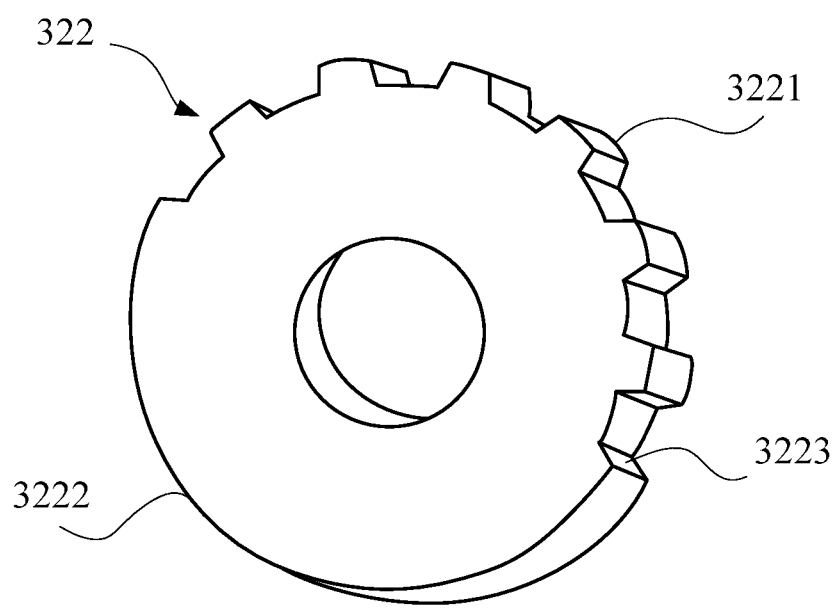
FIG. 6 illustrates a schematic view of a second rotating member in an electronic device according to some embodiments of the present disclosure.

FIG. 6 illustrates a schematic view of a second rotating member in an electronic device according to some embodiments of the present disclosure.

As illustrated in FIG. 6, the second rotating member 322 includes a transmission portion 3221 and a non-transmission portion 3222 which are connected and distributed circumferentially along the rotation. The transmission portion 3221 meshes with the first rotating member 321, while the non-transmission portion 3222 limits the rotation of the second rotating member 322 relative to the first rotating member 321.

The second rotating member 322 is of a half gear structure. The second rotating member 322 includes the transmission portion 3221 having meshing teeth. The meshing of the transmission portion 3221 and the first rotating member 321 enables the rotation driving member 310 to drive the rear camera module 200 to rotate. The second rotating member 322 further includes the non-transmission portion 3222 connected with the transmission portion 3221 and having no meshing teeth. Since the non-transmission portion 3222 is not provided with any meshing teeth, when the second rotating member 322 rotates until the non-transmission portion 3222 is in contact with the first rotating member 321, the transmission cannot be continued.

In such a way, for example, when the rear camera module 200 is rotated to a preset position, like the front image capturing position, the rear camera module 200 cannot continue to rotate according to the original rotation direction. As a result, the transmission portion 3221 has positioning effect, thereby enhancing the stability of the rear camera, and optimizing the image capturing effect.

A junction between the non-transmission portion 3222 and the transmission portion 3221 is a recessed area of the meshing tooth, such that an end surface 3223 of the non-transmission portion 3222 can abut against the meshing teeth of the first rotating member 321, thereby stably limiting the relative rotation of the first rotating member 321 and the second rotating member 322.

A central angle corresponding to the transmission portion 3221 and a central angle corresponding to the non-transmission portion 3222 are not specifically limited, and may be selected according to usage conditions. For example, the central angle corresponding to the transmission portion 3221 is at least 180°, to drive the rear camera module 200 to rotate between a rear image capturing position and a front image capturing position.

In some embodiments, the lifting and rotating assembly 300 includes a holder 330 bearing the rotation driving member 310 and the rear camera module 200. In some embodiments, the holder 330 includes two juxtaposed mounting holes, the rear camera module 200 and the rotation driving member 310 are mounted in the mounting holes respectively, and the rotation driving member 310 is connected with the rear camera module 200.

The lifting and rotating assembly 300 further includes a lift driving member 340 connected with the holder 330, and the lift driving member 340 drives the holder 330 to move up and down.

In such a case, as illustrated in FIG. 5, a first end of the holder 330 is connected with the lift driving member 340, and moves up and down under the drive of the lift driving member 340; the holder 330 has a second end connected with the rear camera module 200 and the rotation driving member 310, to realize synchronous up-and-down movement of the rear camera module 200 and the rotation driving member 310.

In some embodiments, the lift driving member 340 is a stepper motor, and the lift driving member 340 is drivingly connected to the holder 330. In some embodiments, the lifting and rotating assembly 300 further includes a lift transmission member 351 arranged in an ejection direction of the rear camera module 200. The lift transmission member 351 is connected with an output end of the lift driving member 340 and driven to rotate by the lift driving member 340. In some embodiments, the lift transmission member 351 is a threaded rod, and the holder 330 includes a threaded hole in threaded connection with the lift transmission member 351.

In such a way, the holder 330 is moved along a length direction of the lift transmission member 351 under the drive of the lift driving member 340.

As illustrated in FIGS. 2 and 3, in combination with FIG. 5, the lifting and rotating assembly 300 further includes a first guiding member 352 arranged in parallel with the lift transmission member 351. The holder 330 is connected with and sleeved over the first guiding member 352. The rotation of the holder 330 relative to the lift transmission member 351 is limited by the first guiding member 352.

Regarding the structure of the holder 330, it should be noted that the holder 330 includes a first portion 330a and a second portion 330b. The first portion 330a is connected to the rotation driving member 310 and the rear camera module 200, and the second portion 330b is connected to the lift transmission member 351 and the first guiding member 352. The first portion 330a and the second portion 330b are fixedly connected. For example, the holder 330 is of an integrally formed structure, or the first portion 330a is fixed to the second portion 330b by a connecting member or the like.

In some embodiments, the electronic device further includes a second guiding member 400 fixed in the device body 100. The second guiding member 400 is disposed in the ejection direction of the rear camera module 200, and the second guiding member 400 cooperates with the holder 330.

For example, the first portion 330a of the holder 330 is provided with a protruding key 3301, and the second guiding member 400 is configured as a guiding groove fitted with the protruding key 3301.

Moreover, as illustrated in FIG. 5, the second guiding member 400 and the first guiding member 352 are disposed at two sides of the rear camera module 200 respectively. In such a case, the second guiding member 400 and the first guiding member 352 have a guiding effect on the both sides of the rear camera module 200, to sufficiently ensure stable and smooth ejection or retraction of the rear camera module 200, thereby improving the structural stability of the electronic device and optimizing the user experience.

Certainly, the second guiding member 400 may be the protruding key, and the holder 330 is provided with the guiding groove fitted with the second guiding member 400.

The various circuits, device components, modules, units, blocks, or portions may have modular configurations, or are composed of discrete components, but nonetheless can be referred to as "units," "modules," or "portions" in general. In other words, the "circuits," "components," "modules," "blocks," "portions," or "units" referred to herein may or may not be in modular forms.

Those of ordinary skill in the art will understand that the above described modules/units can each be implemented by hardware, or software, or a combination of hardware and software. Those of ordinary skill in the art will also understand that multiple ones of the above described modules/units may be combined as one module/unit, and each of the above described modules/units may be further divided into a plurality of sub-modules/sub-units.

In the present disclosure, it is to be understood that the terms "lower," "upper," "center," "longitudinal," "transverse," "length," "width," "thickness," "upper," "lower," "front," "back," "left," "right," "vertical," "horizontal," "top," "bottom," "inside," "outside," "clockwise," "counterclockwise," "axial," "radial," "circumferential," "column," "row," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the present disclosure, a first element being "on," "over," or "below" a second element may indicate direct contact between the first and second elements, without contact, or indirect through an intermediate medium, unless otherwise explicitly stated and defined.

Moreover, a first element being "above," "over," or "at an upper surface of" a second element may indicate that the first element is directly above the second element, or merely that the first element is at a level higher than the second element. The first element "below," "underneath," or "at a lower surface of" the second element may indicate that the first element is directly below the second element, or merely that the first element is at a level lower than the second feature. The first and second elements may or may not be in contact with each other.

In the description of the present disclosure, the terms "one embodiment," "some embodiments," "example," "specific example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode) display, a flexible display, or any other monitor for displaying information to the user and a keyboard, a pointing device, e.g., a mouse, trackball, etc., or a touch screen, touch pad, etc., by which the user can provide input to the computer.

Other types of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In an example, a user can speak commands to the audio processing device, to perform various operations.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features may be described above as acting in certain combinations and even initially claimed as such, one or more features from a claimed combination can in some cases be excised from the combination, and the claimed combination may be directed to a subcombination or variations of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. An electronic device, comprising: a device body having a side enclosure provided with a camera extending-retracting hole located between a display surface and a back cover; a rear camera module provided in the device body and being able to be ejected from or retracted into the device body through the camera extending-retracting hole; and a lifting and rotating assembly connected with the rear camera module, and driving the rear camera module to be ejected from the device body through the camera extending-retracting hole and rotate, a lift transmission member and a first guiding member arranged in an the ejection direction of the rear camera module; the lift transmission member is connected with an output end of the lift driving member; the first guiding member is arranged in parallel with the lift transmission member; and the holder is in threaded connection with the lift transmission member and is sleeved over the first guiding member wherein a direction of a rotation axis of the rear camera module is parallel to an ejection direction of the rear camera module; and a holder configured to bear a rotation driving member and the rear camera module; and a lift driving member connected with the holder and configured to drive the holder to move up and down; a lift transmission member and a first guiding member arranged in the ejection direction of the rear camera module; the lift transmission member is connected with an output end of the lift driving member; the first guiding member is arranged in parallel with the lift transmission member; and the holder is in threaded connection with the lift transmission member and is sleeved over the first guiding member; and the second rotating member comprises a transmission portion and a non-transmission portion, the transmission portion and the non-transmission portion are distributed circumferentially, the transmission portion is configured to mesh with the first rotating member, and the non-transmission portion is configured to limit rotation of the second rotating member relative to the first rotating member.

2. The electronic device according to claim 1, wherein the lifting and rotating assembly drives the rear camera module ejected from the device body to rotate by at least 180°.

3. The electronic device according to claim 1, wherein the camera extending-retracting hole is provided in an upper portion of the side enclosure.

4. The electronic device according to claim 1, wherein the camera extending-retracting hole is provided in a left or right portion of the side enclosure.

5. The electronic device according to claim 1, wherein the rear camera module is drivingly connected to the rotation driving member, and a rotating shaft of the rotation driving member is juxtaposed with a rotating shaft of the rear camera module.

6. The electronic device according to claim 5, wherein a first rotating member is connected to an output end of the rotation driving member, and the rear camera module is provided with a second rotating member meshing with the first rotating member.

7. The electronic device according to claim 6, wherein the transmission portion has meshing teeth and the non-transmission portion has no meshing tooth.

8. The electronic device according to claim 6, wherein the rear camera module comprises:
   a main body configured to encapsulate at least one camera; and
   a connecting portion connected to the main body, an end of the connecting portion away from the main body being connected with the second rotating member.

9. The electronic device according to claim 8, wherein the second rotating member is connected to an end of the connecting portion away from the main body.

10. The electronic device according to claim 1, wherein the holder has a first end connected with the lift driving member and a second end connected with the rear camera module and the rotation driving member.

11. The electronic device according to claim 1, wherein the holder includes a first portion and a second portion, the first portion is connected to the rotation driving member and the rear camera module, and the second portion is connected to the lift transmission member and the first guiding member.

12. The electronic device according to claim 1, further comprising a second guiding member arranged the ejection direction of the rear camera module and cooperating with the holder.

13. The electronic device according to claim 12, wherein the holder is provided with a protruding key, and the second guiding member comprises a guiding groove fitted with the protruding key.

14. The electronic device according to claim 12, wherein the second guiding member and the first guiding member are disposed at different sides of the rear camera module.

* * * * *